United States Patent
Ootani

(10) Patent No.: US 8,200,936 B2
(45) Date of Patent: Jun. 12, 2012

(54) SYSTEMS AND METHODS FOR RECORDING INFORMATION TO A MEMORY CARD

(75) Inventor: Takuya Ootani, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 57 days.

(21) Appl. No.: 12/895,621

(22) Filed: Sep. 30, 2010

(65) Prior Publication Data

US 2011/0078391 A1    Mar. 31, 2011

(30) Foreign Application Priority Data

Sep. 30, 2009    (JP) .................................. 2009-228125

(51) Int. Cl.
*G06F 13/00*    (2006.01)

(52) U.S. Cl. ............. 711/170; 711/154; 713/1; 707/821; 707/824; 707/828

(58) Field of Classification Search ................... 711/170, 711/154; 713/1; 707/821, 824, 828
See application file for complete search history.

(56) References Cited

U.S. PATENT DOCUMENTS

| | | | |
|---|---|---|---|
| 5,708,650 A * | 1/1998 | Nakashima et al. | 369/275.3 |
| 7,406,491 B1 | 7/2008 | Iwano | |
| 2003/0076764 A1 | 4/2003 | Iwano et al. | |
| 2004/0250172 A1 * | 12/2004 | Patel et al. | 714/42 |
| 2005/0265162 A1 | 12/2005 | Tsubakihara | |
| 2007/0088666 A1 * | 4/2007 | Saito | 707/1 |
| 2007/0276882 A1 * | 11/2007 | Nishimura et al. | 707/203 |
| 2008/0082773 A1 * | 4/2008 | Tomlin et al. | 711/170 |
| 2008/0098161 A1 * | 4/2008 | Ito | 711/103 |

FOREIGN PATENT DOCUMENTS

| | | |
|---|---|---|
| JP | 04-225441 A | 8/1992 |
| JP | 08-069403 A | 3/1996 |
| JP | 2000-339202 A | 12/2000 |
| JP | 2001-043117 A | 2/2001 |
| JP | 2001-243096 A | 9/2001 |
| JP | 2001-337851 A | 12/2001 |
| JP | 2004-355640 A | 12/2004 |
| JP | 2005-339262 A | 12/2005 |
| JP | 2009-110136 A | 5/2009 |

OTHER PUBLICATIONS

Office Action mailed by Japan Patent Office on Dec. 7, 2010 in the corresponding Japanese patent application No. 2009-228125.

* cited by examiner

*Primary Examiner* — Hong Kim
(74) *Attorney, Agent, or Firm* — Knobbe Martens Olson & Bear LLP

(57) ABSTRACT

A recording area of an information recording medium is divided into a plurality of management areas. In the case where one of the management areas is selected and first file data are requested to be written, the scalability of file data that are lastly written in the selected management area is determined. If the scalability is high, the file data are written in the next management area, and, if the scalability is low, the first file data are written in succession to the file data.

6 Claims, 13 Drawing Sheets

SYSTEMS AND METHODS FOR RECORDING INFORMATION TO A MEMORY CARD

CROSS-REFERENCE TO RELATED APPLICATION

This application claims priority from Japanese Patent Application No. 2009-228125, filed on Sep. 30, 2009, the entire contents of which are hereby incorporated by reference.

BACKGROUND

1. Field

One embodiment of the invention relates to an information recording apparatus, information recording method, and a computer-readable medium which are suitable for recording information on, for example, a memory card such as an SD (Secure Digital) card.

2. Description of the Related Art

In a file system which controls writing of data onto an information recording apparatus such as the above-mentioned memory card or an HDD (Hard Disk Drive), in the case where file data are to be written onto an information recording medium in accordance with a data writing request from an application, the file data are sequentially written onto the medium with starting from the top recording area.

Namely, it is usually said that, in the case where one file is configured by a plurality of file data, when the file data are to be written onto an information recording medium, all the file data constituting the file are preferably written to be continuous on recording areas of the information recording medium.

This is performed in view of the following reason. In a semiconductor memory which is used as an information recording medium in a memory card, when a writing or reading process is performed in a data unit which is continuous, and which is somewhat large, such as 128 kbytes, the processing speed can be increased.

When a plurality of files each configured by a plurality of file data are to be simultaneously written onto an information recording medium in accordance with a data writing request from an application, there is a possibility that respective file data constituting each file are randomly written, and the continuity of file data constituting the same file is impaired.

JP-A-4-225441 discloses a configuration where a recording area of a recording medium is managed while being divided into a plurality of continuous zones, and, in the case where preparation instructions are given to a plurality of files in a parallel manner, different continuous zones are occupied in respective files, so that data of one file are continuously recorded in one continuous zone.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION OF EXEMPLARY EMBODIMENTS

Hereinafter, an exemplary embodiment of the invention will be described in detail with reference to the drawings. In the embodiment, an exemplary embodiment will be described in connection with a PC (Personal Computer). However, the exemplary embodiment can be similarly applied to any file system mounting apparatus having a file system for managing data which are to be recorded on an information recording medium such as a digital television broadcast receiver or an optical disk recorder.

Figure 1:
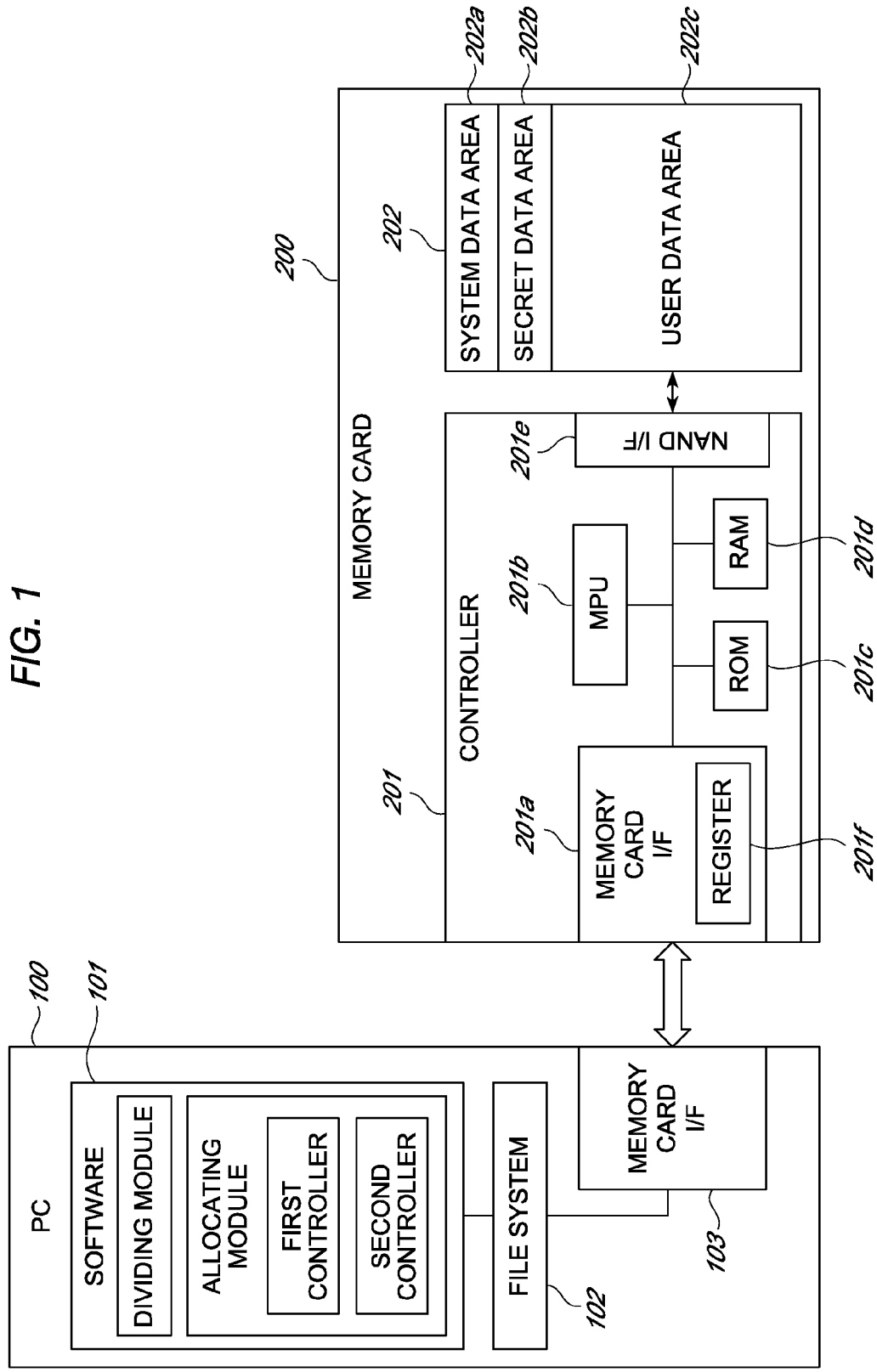
FIG. 1 is a block configuration diagram showing an embodiment of the invention, and schematically illustrates main components of a PC and a memory card which is to be managed by the PC.

FIG. 1 schematically shows, as functional blocks, main components of a PC 100 which will be described in the embodiment, and main components of a memory card 200 which is to be managed by the PC 100. The functional blocks can be realized in the form of one of hardware and computer software, or a combination of the both. Therefore, the blocks will be schematically described from the viewpoint of their functions so as to clarify that they can be realized by any of the means.

Whether these functions are executed as hardware or software depends on a specific embodiment or design restrictions which are imposed on the whole system. Those skilled in the art can realize these functions by various methods for each of specific embodiments. Determination of such realization is within the scope of the invention.

As shown in FIG. 1, the PC 100 includes hardware and software (system) for accessing the memory card 200 which is inserted into and connected to the PC. The PC 100 includes software 101 such as applications and an operating system.

When a process such as writing of data onto the memory card 200 or reading of data from the memory card 200 is instructed by a user's operation, the software 101 causes a CPU (Central Processing Unit) (see FIG. 10) to execute the process. The CPU which executes the software 101 instructs the memory card 200 to write or read data, through a file system 102.

The file system 102 is a scheme for managing files recorded on an information recording medium (the memory card 200)

which is a management object. The file system 102 records management information into a recording area of the information recording medium, and manages files by using the management information.

In the file system 102, namely, a method of preparing directory information of files or folders in the information recording medium, methods of moving and deleting files or folders, a system of recording data, a location where the management information is recorded, a method of using the management information, and the like are set in advance. The file system 102 is formed on the basis of the FAT (File Allocation Table) file system, and, in the embodiment, the file system 102 is configured to be able to execute operations which will be described below. Specific operations will be suitably described in a sequential manner.

Furthermore, the PC 100 includes a memory card interface 103. The memory card interface 103 is configured by hardware or software, which is required for performing an interface process between the PC 100 and a controller 201 of the memory card 200. The PC 100 executes communication with the memory card 200 through the memory card interface 103.

In this case, the memory card interface 103 defines various communication arrangements which are required for enabling the PC 100 and the memory card 200 to communicate with each other. Namely, the memory card interface 103 includes a set of various commands which are mutually recognizable with respect to a memory card interface 201a that constitutes the controller 201 of the memory card 200. The memory card interface 103 further includes a hardware configuration (the arrangement and number of pins, and the like) which can be connected to the memory card interface 201a of the memory card 200.

When the memory card 200 is connected to the PC 100 in a power ON state, or when the power supply of the PC 100 is turned ON in a state where the memory card 200 is connected to the PC 100 in a power OFF state, the memory card 200 receives a power supply from the PC 100, performs the initialization operation, and then executes a process corresponding to an access from the PC 100.

The memory card 200 includes a memory 202 such as a NAND-type flash memory, and the controller 201 which controls the memory 202. In the memory 202, data are nonvolatily recorded, and data are written or read in a unit called a page configured by a plurality of memory cells. Physical addresses which are unique to the respective pages are assigned to the pages. In the memory 202, data are deleted in a unit called a physical block configured by a plurality of pages. Alternatively, sometimes physical addresses may be assigned in the unit of a physical block.

The controller 201 manages the data recording state in the memory 202. Here, the management of the recording state indicates the management of correspondence relationships showing that a page (or physical block) of a certain physical address holds data of a certain logical address assigned by the PC 100, information indicating that a page (or physical block) of a certain physical address is a deleted state (a state where nothing is written, or where invalid data are held).

In this case, the controller 201 includes the memory card interface 201a, an MPU (Micro Processing Unit) 201b, a ROM (Read Only Memory) 201c, a RAM (Random Access Memory) 201d, a NAND interface 201e, etc.

The memory card interface 201a is configured by hardware, software, and the like which are required for performing an interface process between the PC 100 and the controller 201. The memory card 200 executes communication with the PC 100 through the memory card interface 201a.

Similarly with the memory card interface 103 of the PC 100, the memory card interface 201a defines arrangements which enable the memory card 200 and the PC 100 to communicate with each other, and includes a set of various commands, and a hardware configuration (the arrangement and number of pins, and the like). The memory card interface 201a further includes a register 201f.

The MPU 201b generally controls operations of the whole memory card 200. When the memory card 200 receives the power supply, for example, the MPU 201b reads firmware (control program) stored in the ROM 201c into the RAM 201d, and executes processes.

Based on the control program, the MPU 201b produces various tables (described later) on the RAM 201d, and, when receiving a write command, a read command or a delete command from the PC 100, executes a predetermined process for accessing the memory 202.

Furthermore, the ROM 201c stores the control program which is to be executed by the MPU 201b as described above.

The RAM 201d provides a work area to the MPU 201b, and stores the control program and various tables. Such tables include a conversion table (logical/physical table) in which a logical address that is assigned to data by the file system 102 of the PC 100 corresponds to a physical address of a page that actually stores data having the logical address.

The NAND interface 201e performs an interface process between the controller 201 and the memory 202.

The recording area in the memory 202 is divided into a plurality of areas in accordance with the kind of data to be stored. The plural areas include a system data area 202a, a secret data area 202b, and a user data area 202c.

Among the areas, the system data area 202a is an area which is allocate in the memory 202 by the controller 201 in order to store data required for the operation of the controller. Namely, the system data area 202a stores mainly management information relating to the memory card 200, and card information such as security information and media ID (IDentification) of the memory card 200.

The secret data area 202b is an area which stores key information used in encryption, secret data used in authentication, and the like. The secret data area 202b is configured so that the PC 100 cannot access the area.

The user data area 202c is an area which can be freely accessed and used by the PC 100. The user data area 202c stores user data such as an AV (Audio Visual) content file, and video data. In the following description, it is assumed that the recording area of the memory 202 means the user data area 202c.

The above-described controller 201 ensures a part of the user data area 202c, and control data (the logical/physical table) required for the operation of the controller are stored into the user data area 202c. The user data area 202c is logically formatted as another volume, and subjected to file management by the PC 100.

Next, the logical format of the memory 202 will be described. The memory 202 is logically formatted in the following format. The process of logically formatting the memory 202 is performed by the file system 102 in the PC 100.

For the explanation of the logical formatting of the memory 202 by the file system 102, the FAT file system on which the file system 102 is based will be summarily described with reference to FIGS. 2 and 3.

Figure 2:
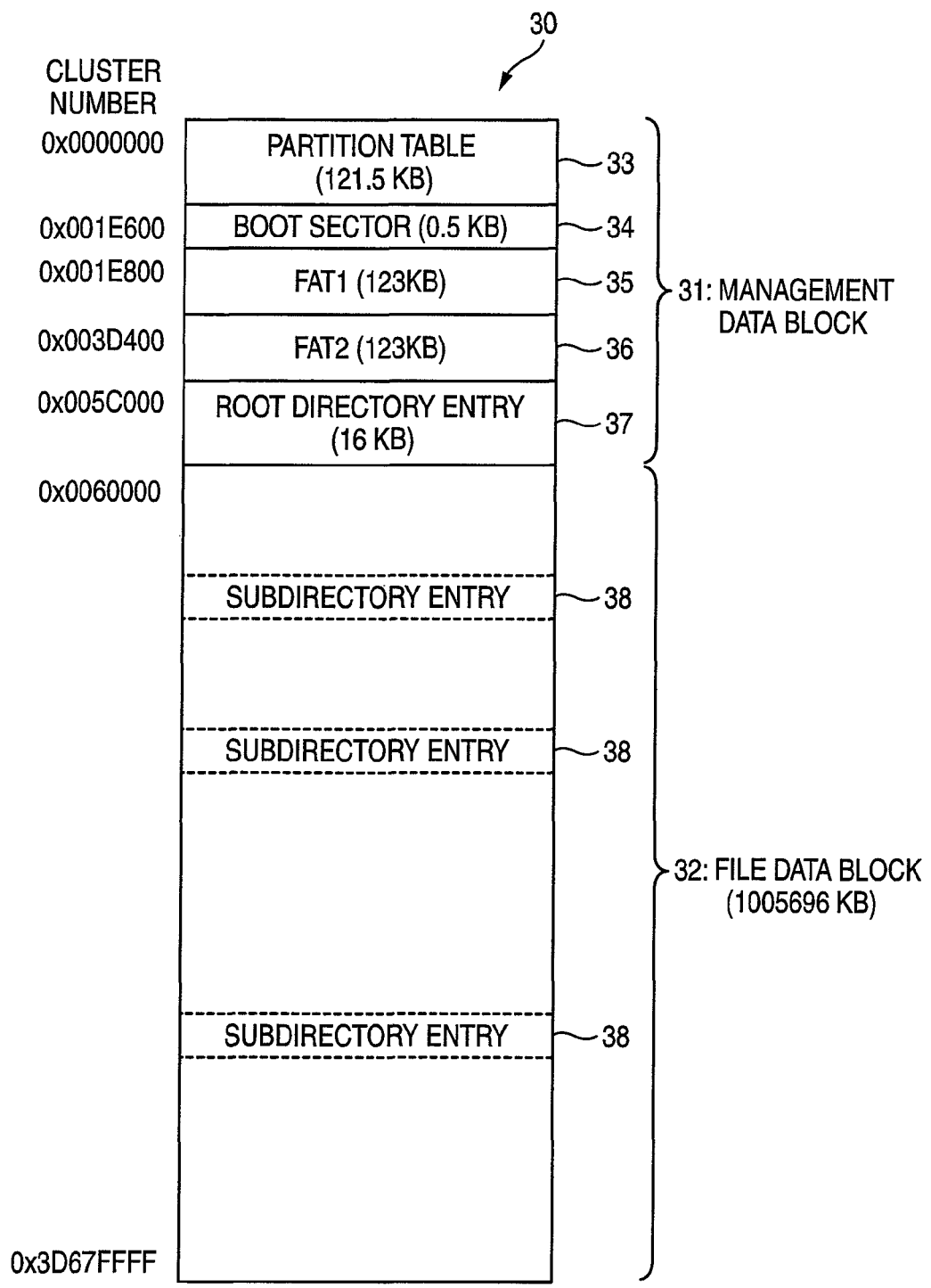
FIG. 2 is a diagram illustrating an example of a memory space which is logically formatted by the FAT file system.

FIG. 2 shows a memory space 30 of the memory 202 which is logically formatted by the FAT file system. The following management data are written in the memory space 30. The memory space 30 in the specification means a memory area which can be freely accessed by the FAT file system, and, in the memory 202 in FIG. 1, corresponds to the user data area 202c.

As shown in FIG. 2, the FAT file system manages the memory space 30 which is a management object, while dividing the space 30 into clusters of a predetermined size (for example, 16 kbytes). In the memory space 30, management data are allocated to areas from the lowest cluster number to the range indicated by a predetermined cluster number. Hereinafter, the area in which management data are to be recorded is referred to as the management data block 31.

An area which is indicated by a cluster number that is higher than the management data block 31 is formed as a data recording area in which a plurality of file data constituting a file are to be written. Hereinafter, the data recording area is referred to as the file data block 32.

The management data block 31 is divided into: a partition table area 33 which is allocated to a partition table; a boot sector area 34 which is allocated to a boot sector; an FAT1 area 35 which is allocated to FAT1; an FAT2 area 36 which is allocated to FAT2; and a root directory entry area 37 which is allocated to a root directory entry.

Among the areas, the partition table area 33 stores information such as the file system type of each partition, and the initial sector of the partition. The boot sector area 34 is located in the initial sector indicated by the partition table, and stores a BPB [BIOS (Basic Input/Output System) Parameter Block].

The BPB indicates various parameters of the memory 202 which are to be used by the file system. In the FAT file system, when the memory 202 is logically formatted, the parameters are written. In the FAT file system, moreover, the BPB is read in activation, so that the parameter of the file format is recognized.

Furthermore, the FAT1 area 35 stores information indicating the cluster in which a part (hereinafter, referred to simply as file data) of file data that are written in the memory, and that are divided into the size of a cluster is recorded, and information indicating relations of clusters for reconstructing file data. The FAT2 area 36 is a backup area for FAT1, and stores the same contents as the FAT1 area 35.

It is advantageous that file data constituting one file are allocated to continuous clusters. In the FAT file system, therefore, empty clusters are allocated in accordance with the sequence of the cluster numbers. FAT1 and FAT2 store information indicating connection relationships of clusters which store file data. According to the configuration, based on the information stored in FAT1 and FAT2 (hereinafter, referred to simply as FAT), data are read out from the clusters, whereby the original file is reconstructed.

In the root directory entry area 37, file entries of files belonging to the root directory are recorded. Each file entry includes the file name or the folder name, the file size, the attribute, the updating time information of the file, a flag indicating which cluster is the initial cluster of the file, and the like. Depending on the version of the FAT format type [for example, FAT16, FAT32, or ex (extended)-FAT], the root directory entry may be placed at an arbitrary address behind the FAT.

In the case where a certain file belongs to a subdirectory belonging to the root directory, the number of a cluster which is allocated to the entry (subdirectory entry) of the subdirectory belonging to the root directory is written in the root directory entry area 37.

The subdirectory entry holds file entries of files belonging to the subdirectory. As shown in FIG. 2, the subdirectory entry is written into an arbitrary cluster 38 in the file data block 32 by the FAT file system. Also, the subdirectory entry belongs to the management data, and is often frequently rewritten.

Figure 3:
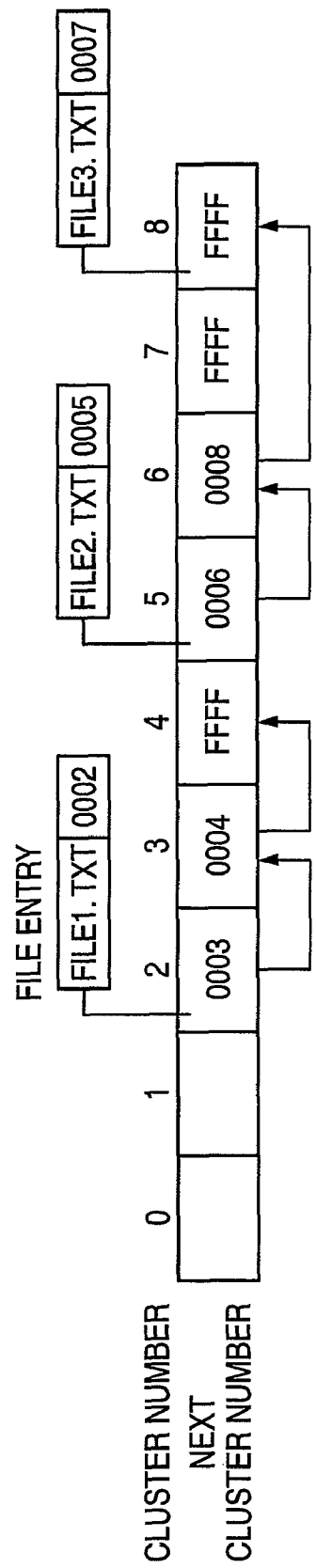
FIG. 3 is a diagram illustrating an example of an FAT and a file entry.

FIG. 3 shows an example of the FAT and the file entry. As shown in FIG. 3, the root directory entry stores, as file entries, position information of the initial clusters of files "FILE1.TXT", "FILE2.TXT", and "FILE3.TXT". The cluster numbers of the initial clusters of files "FILE1.TXT", "FILE2.TXT", and "FILE3.TXT" are 0002, 0005, and 0007, respectively.

In the FAT, the number of the cluster to which connection is to be made next to each cluster is written. In the case of "FILE1.TXT", for example, the number of the cluster which is to store data subsequent to data of the initial cluster (cluster number: 0002) is 0003, and the number of the cluster which is to store data subsequent to data of the cluster (cluster number: 0003) is 0004.

When data of the clusters (cluster numbers: 0002, 0003, and 0004) are connected to one another, the file of "FILE1.TXT" is reconstructed. In the cluster which is to store the final portion of the file data, "FFFF" is written.

Next, with reference to FIG. 4, the file system 102 which is based on the FAT file system will be described. In the file system 102, the memory 202 is logically formatted as described below. Namely, the memory 202 is logically formatted by the file system 102.

Figure 4:
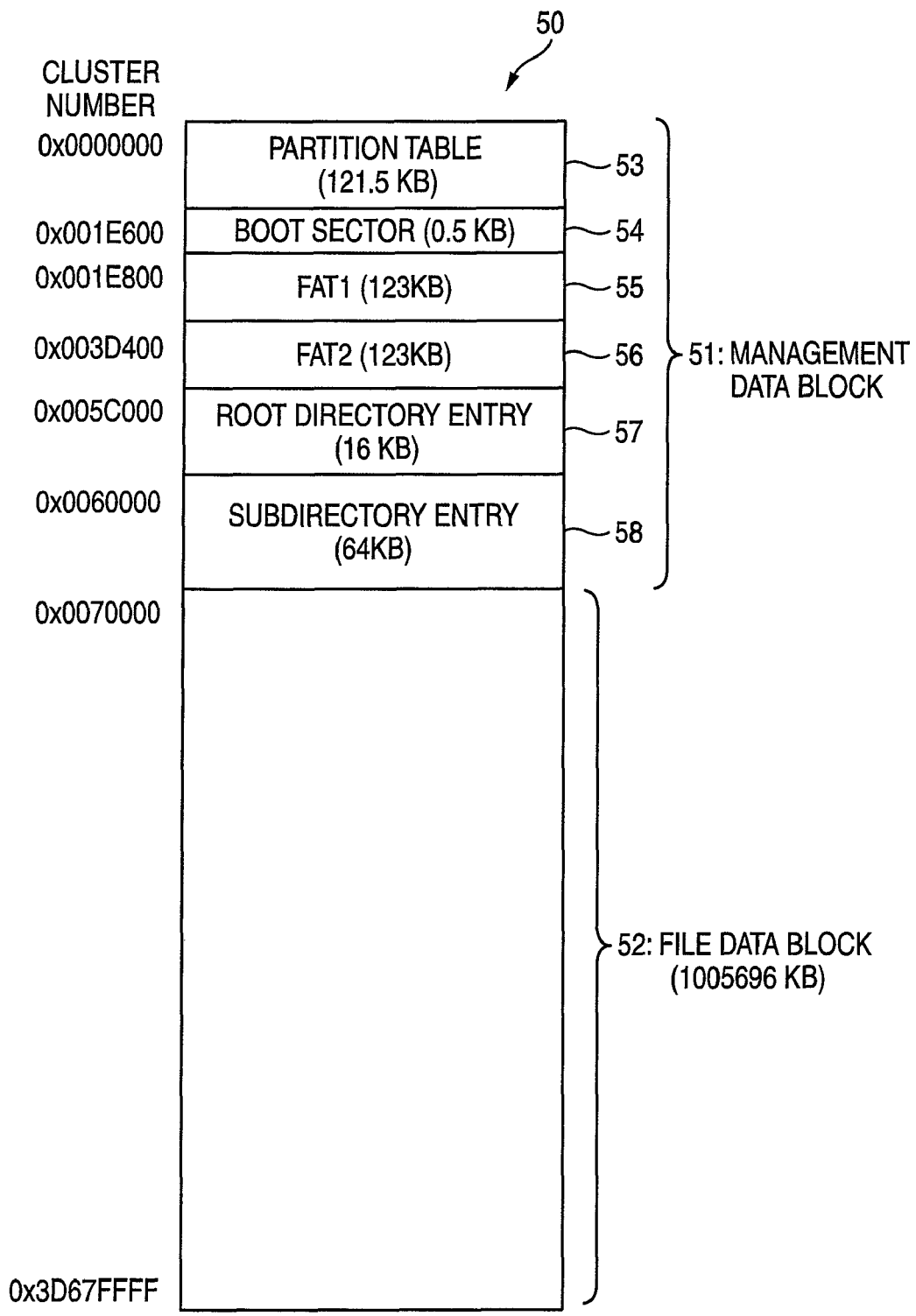
FIG. 4 is a diagram illustrating an example of a memory space which is logically formatted by a file system in the embodiment.

FIG. 4 shows a memory space 50 of the memory 202 which is logically formatted by the file system 102. The memory space 50 shown in FIG. 4 corresponds to the user data area 202c which, in the recording areas of the memory 202 that is a formatting object, can be used by the file system 102.

As shown in FIG. 4, the file system 102 restricts the recording areas to which management data that are used by the system for managing data are allocated, to areas from the lowest cluster number of the user data area 202c to the range indicated by a predetermined cluster number (or a logical address). Namely, management data are allocated and recorded to a recording area of a cluster number (or a logical address) in the predetermined range.

In the same manner as data used in the FAT file system, management data include a partition table, a boot sector, FAT1, FAT2, a root directory entry, and a subdirectory entry.

A block (a management data block 51) which stores management data includes: a partition table area 53 which is allocated to the partition table; a boot sector area 54 which is allocated to the boot sector; an FAT1 area 55 which is allocated to FAT1; an FAT2 area 56 which is allocated to FAT2; a root directory entry area 57 which is allocated to the root directory entry; and a subdirectory entry area 58 which is allocated to the subdirectory entry. The data stored in the areas ranging from the partition table area 53 to the subdirectory entry area 58 are identical with those which are defined in the above-described FAT file system.

The portion of the memory space 50 other than the management data block 51 is formed as a file data block 52 dedicated for writing file data. The capacity of the management data block 51 is determined in consideration of the size of the memory space 50, and the size of the file data block 52 which is requested to be ensured.

For example, the partition table area 53 has a capacity of 121.5 kbytes, the boot sector area 54 has a capacity of 0.5 kbytes, the FAT1 area 55 has a capacity of 123 kbytes, the FAT2 area 56 has a capacity of 123 kbytes, the root directory entry area 57 has a capacity of 16 kbytes, and the subdirectory entry area 58 has a capacity of 64 kbytes.

The file system 102 is based on the FAT file system (irrespective of the differences among FAT16, FAT32, and ex-FAT). The file system is not restricted to the FAT file system, and may use a similar file system including an extension of the FAT. For example, a file system which manages file data by using management data, and which frequently rewrites the management data corresponds to such a system.

The memory card 200 is logically formatted by the file system 102. Therefore, the memory 202 is logically formatted as shown in FIG. 4.

Figure 5:
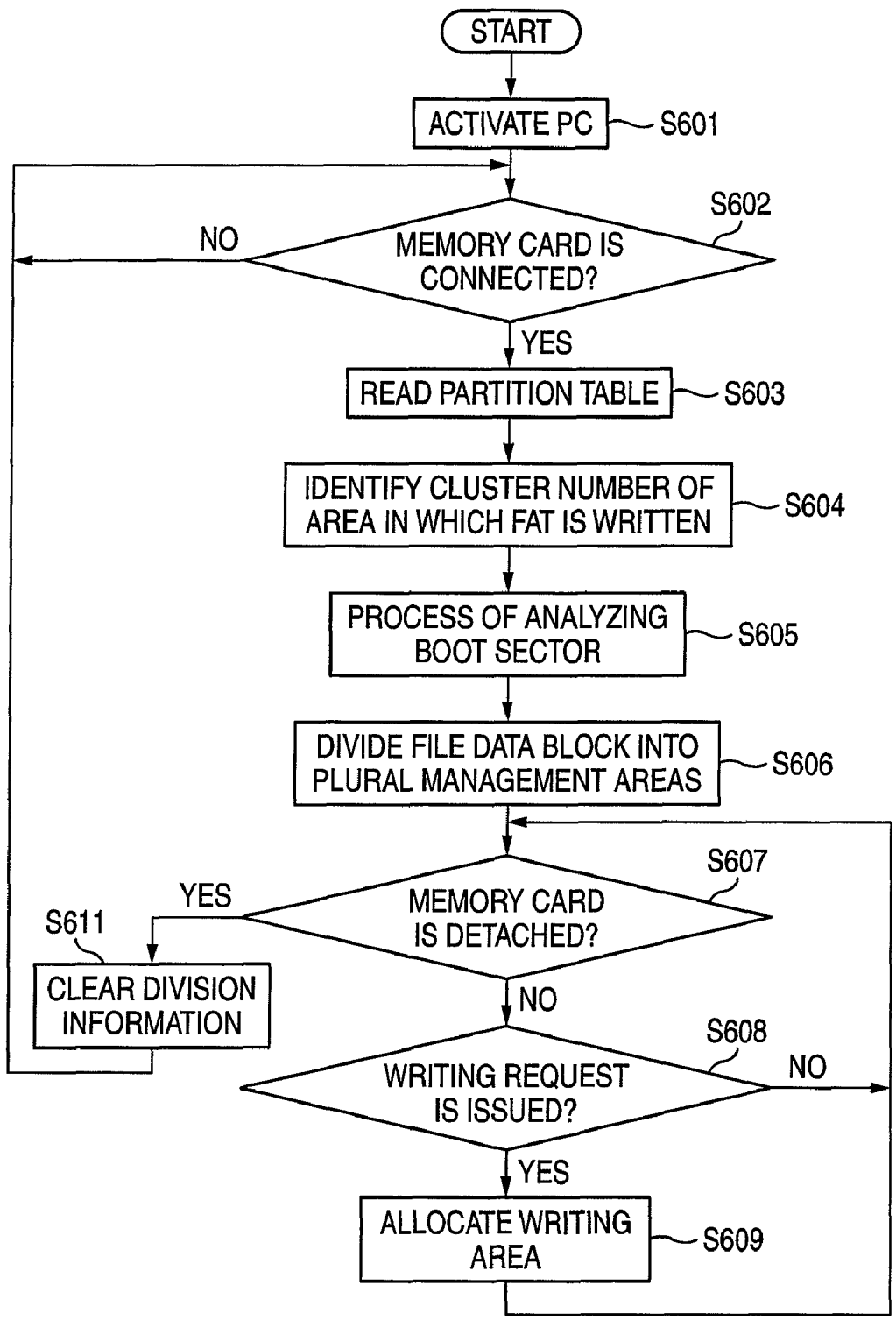
FIG. 5 is a flowchart illustrating an example of a recording area allocating process which is executed by the file system in the embodiment.

Next, a recording area allocating process which is performed on file data to be written in the memory 202 that is logically formatted as shown in FIG. 4 will be described with reference to FIG. 5. When the PC 100 is activated (step S601), first, the file system 102 is set to a waiting state where the system waits for connection of the memory card 200 to the memory card interface 103 (step S602: NO).

If the memory card 200 is connected to the memory card interface 103 (step S602: YES), the file system 102 accesses the user data area 202c of the memory 202 to execute an operation of reading the partition table from the partition table area 53 in the user data area 202c (step S603).

Next, the file system 102 identifies the cluster numbers (or logical addresses) of the FAT1 area 55 and FAT2 area 56 in which FAT1 and FAT2 are written, in the user data area 202c from the read partition table (step S604), and executes an analyzing process on the boot sector area 54 which is located in the initial sector indicated in the read partition table (step S605).

Specifically, the file system 102 executes an analyzing process on the boot sector area 54 to execute an operation of reading the BPB. The BPB indicates various parameters of the memory 202 such as the cluster number and size of the file data block 52 in the areas of the user data area 202c, and the cluster numbers and sizes of the root directory entry area 57 and subdirectory entry area 58 in which the root directory and the subdirectory are written.

Furthermore, the file system 102 divides the file data block 52 into a plurality of management areas as indicated by the cluster numbers and sizes which are read in the analyzing process on the boot sector area 54, and records the cluster numbers of the lowest (or highest) clusters of the management areas, as division information (step S606).

Figure 6:
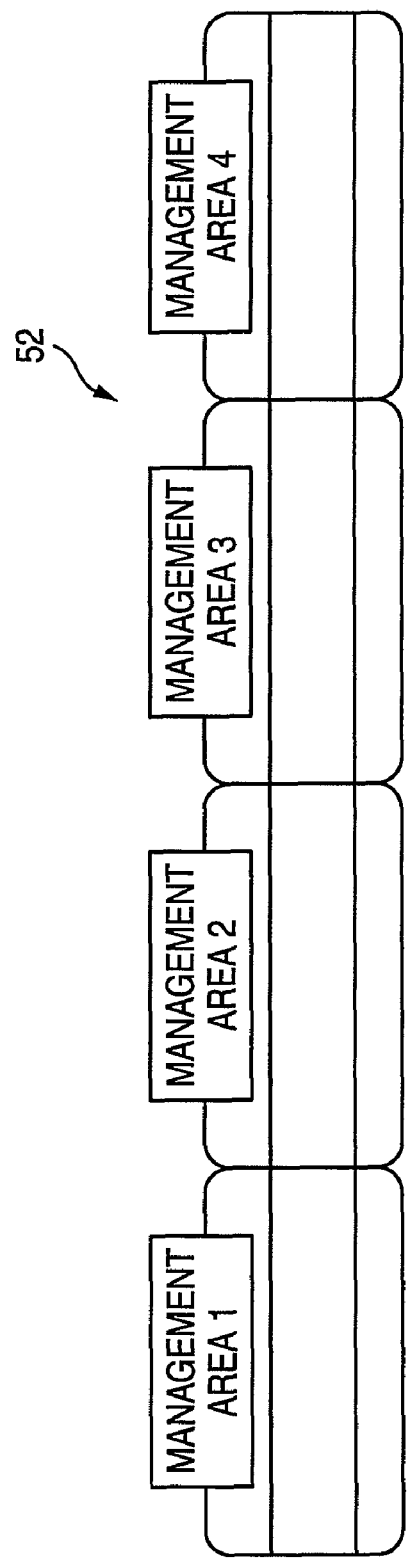
FIG. 6 is a diagram illustrating an example that a file data block is divided into a plurality of management areas.

FIG. 6 shows an example of the division of the file data block 52 into a plurality of management areas. In this case, it is assumed that the file system 102 divides the file data block 52 into management areas the number (for example, four) of which is equal to that of software (application) to be executed by the PC 100.

Furthermore, it is assumed that the file system 102 divides the file data block 52 into management areas 1 to 4 having a size that is divisible by a size (for example, 512 kbytes) at which the speed of writing file data can be increased, and ensures the remaining area as a miscellaneous area.

Thereafter, the file system 102 monitors whether the memory card 200 is detached from the memory card interface 103 or not (step S607), and enters a waiting state where the system waits for a request for writing file data from the software (application) 101 (step S608). If the memory card 200 is detached from the memory card interface 103 (step S607: YES), the file system 102 clears the recorded division information (step S611), and returns to the process of step S602.

By contrast, if the memory card 200 is not detached from the memory card interface 103 (step S607: NO), and the software 101 issues the request for writing file data (step S608: YES), the file system 102 performs allocation of a cluster in which the write-requested file data is to be written, and supplies the logical addresses of logical blocks assembled into the allocated cluster, and the file data to which the writing request is issued, to the controller 201 (step S609).

Specifically, in the case where the file data to which the writing request is issued is to be written into the file data block 52, the file system 102 accesses the root directory entry area 57 in the management data block 51 in accordance with the cluster number of the root directory entry indicated by the BPB which is read in step S605, and executes an operation of reading the root directory entry.

Next, the file system 102 refers the file name included in the read root directory entry, and determines whether file data constituting the same file as the file data to which the writing request is issued are written or not. If it is determined that file data constituting the same file as the file data to which the writing request is issued are written, the file system 102 refers the flag indicating which cluster included in the read root directory entry is the initial cluster of the file, and the cluster numbers of the lowest (or highest) clusters of the management areas indicated by the division information, and identifies the management area in which file data constituting the same file as the file data to which the writing request is issued are written.

Thereafter, the file system 102 accesses the FAT1 area 55 and the FAT2 area 56 in accordance with the cluster numbers which are identified in step S604, and executes an operation of reading FAT1 and FAT2. Then, the file system 102 refers the read FAT1 and FAT2, and, in the identified management area, allocates the area subsequent to that in which file data have already been written, i.e., the cluster subsequent to that in which "FFFF" is written in FAT1 or FAT2, to the writing area of the file data to which the writing request is issued.

By contrast, if file data constituting the same file as the file data to which the writing request is issued are not written, the file system 102 accesses the FAT1 area 55 and the FAT2 area 56 in accordance with the cluster numbers which are identified in step S604, and executes an operation of reading FAT1 and FAT2.

Then, the file system 102 refers the cluster numbers of the lowest (or highest) clusters of the management areas indicated by the read FAT1 and FAT2 and the division information, and identifies a management area in which file data have not yet been written. Thereafter, the file system 102 allocates an area (a cluster subsequent to the lowest cluster) of the identified management area, to the writing area of the file data to which the writing request is issued.

In the case where there are a plurality of management areas in which file data have not yet been written, the file system 102 sequentially allocates areas of the management areas to the writing area, in descending sequence of the cluster number indicated by the division information.

If file data constituting the same file as the file data to which the writing request is issued are not written, and a management area in which file data have not yet been written does not exist, in one (for example, a management area in which the cluster number indicated by the division information is higher) of the plural management areas, the file system 102 allocates the area subsequent to that in which file data have already been written (the cluster subsequent to that in which "FFFF" is written in FAT1 or FAT2), to the writing area.

Figure 7:
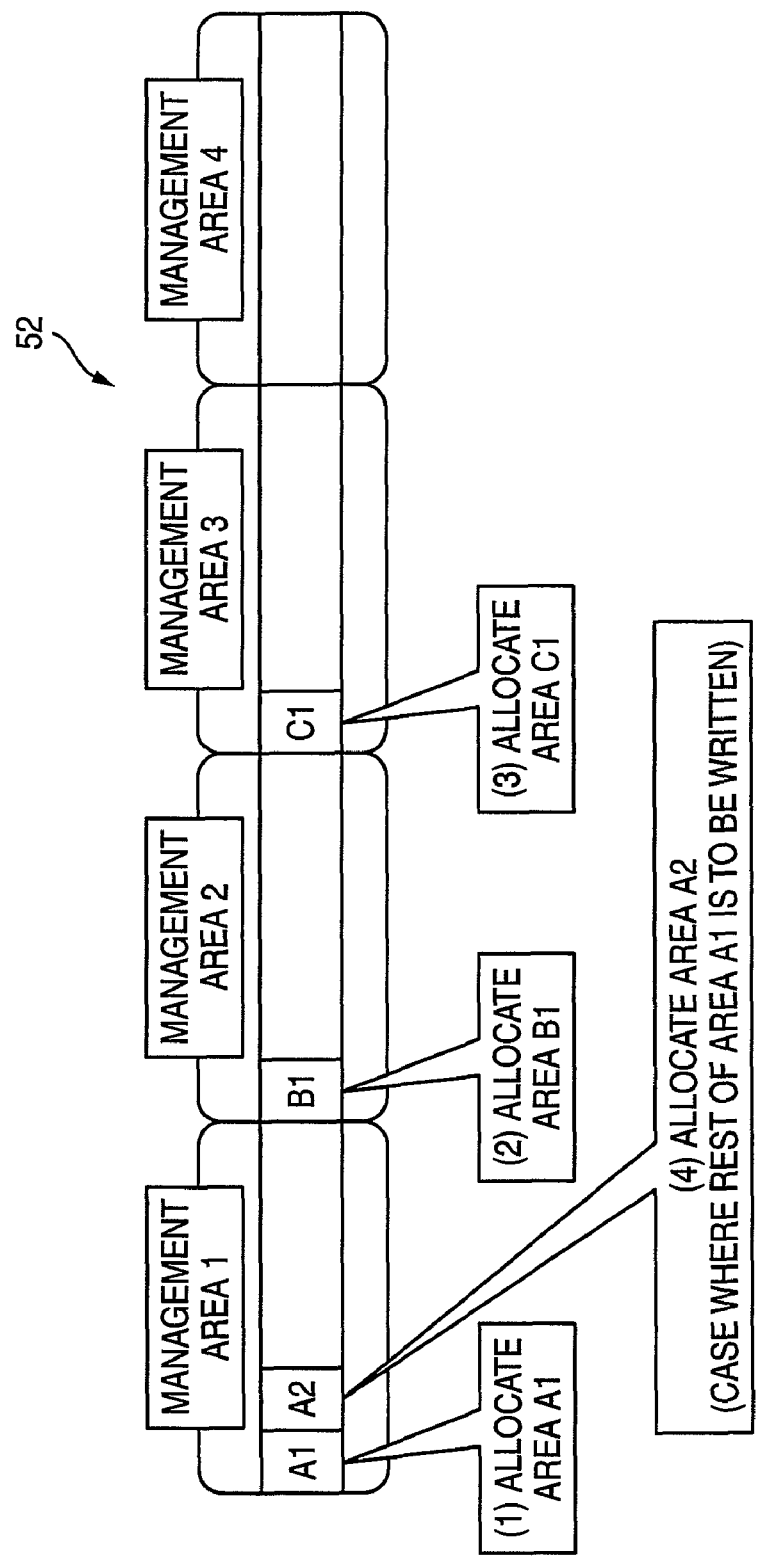
FIG. 7 is a diagram illustrating an example of a writing area allocating process which is performed on the plural divided management areas in the embodiment.

FIG. 7 specifically illustrates the above-described writing area allocating process. In the case where, in a state where file data have not yet been written in the four management areas 1 to 4, a request for writing file data constituting file A is issued, the file system 102 allocates area A1 configured by a cluster subsequent to the initial cluster in management area 1 in which the cluster number indicated by the division information is lowest, to the writing area in which the file data to which the writing request is issued are to be written [(1) in FIG. 7].

In the case where, in a state where file data are written only in management area 1, a request for writing file data constituting file B is issued, the file system 102 allocates area B1 configured by a cluster subsequent to the initial cluster in management area 2 in which the cluster number indicated by the division information is low next to that of management area 1, to the writing area in which the file data to which the writing request is issued are to be written [(2) in FIG. 7].

In the case where, in a state where file data are written in management areas 1 and 2, a request for writing file data constituting file C is issued, the file system 102 allocates area C1 configured by a cluster subsequent to the initial cluster in management area 3 in which the cluster number indicated by the division information is low next to that of management area 2, to the writing area in which the file data to which the writing request is issued are to be written [(3) in FIG. 7].

In the case where, in a state where file data are written in management areas 1 to 3, a request for writing file data which constitute file A, and which are subsequent to those written in area A1 is again issued, the file system 102 allocates area A2 which is subsequent to area A1 in management area 1, to the writing area in which the file data to which the writing request is issued are to be written [(4) in FIG. 7].

According to the file system 102, file data constituting different files A to C can be prevented from being written in the same management areas 1 to 4 as far as possible. Therefore, it is possible to improve the possibility that a plurality of file data constituting respective files A, B, and C are continuously written in the respective different management areas 1, 2, and 3.

When receiving the logical address and file data output from the file system 102, the MPU 201b of the controller 201 converts the received logical address to a physical address by using the logical/physical table stored in the RAM 201d, and writes the received file data in a page indicated by the converted physical address.

Figure 9:
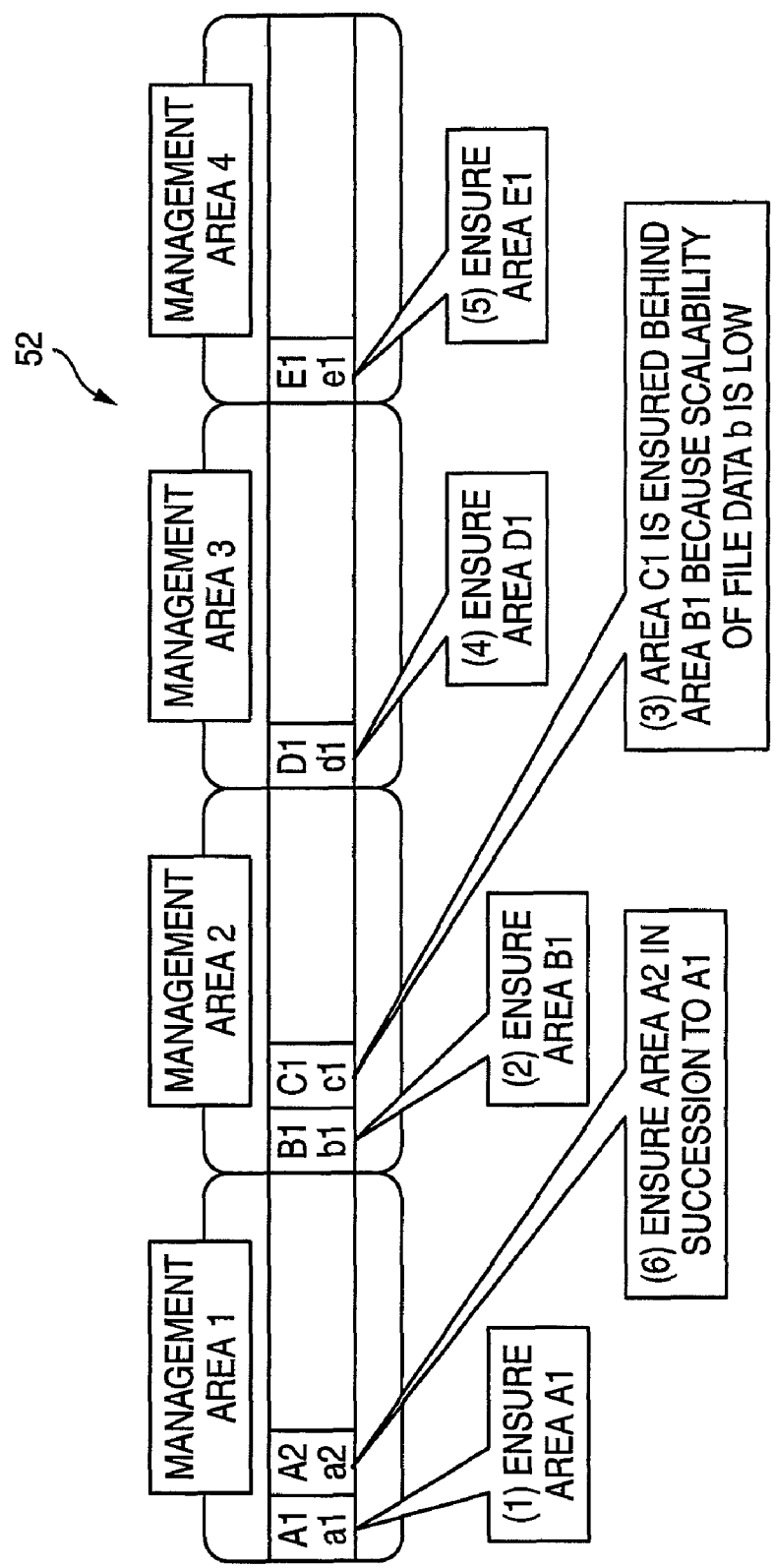
FIG. 9 is a diagram illustrating another example of the writing area allocating process which is performed on the plural divided management areas in the embodiment.
Figure 10:
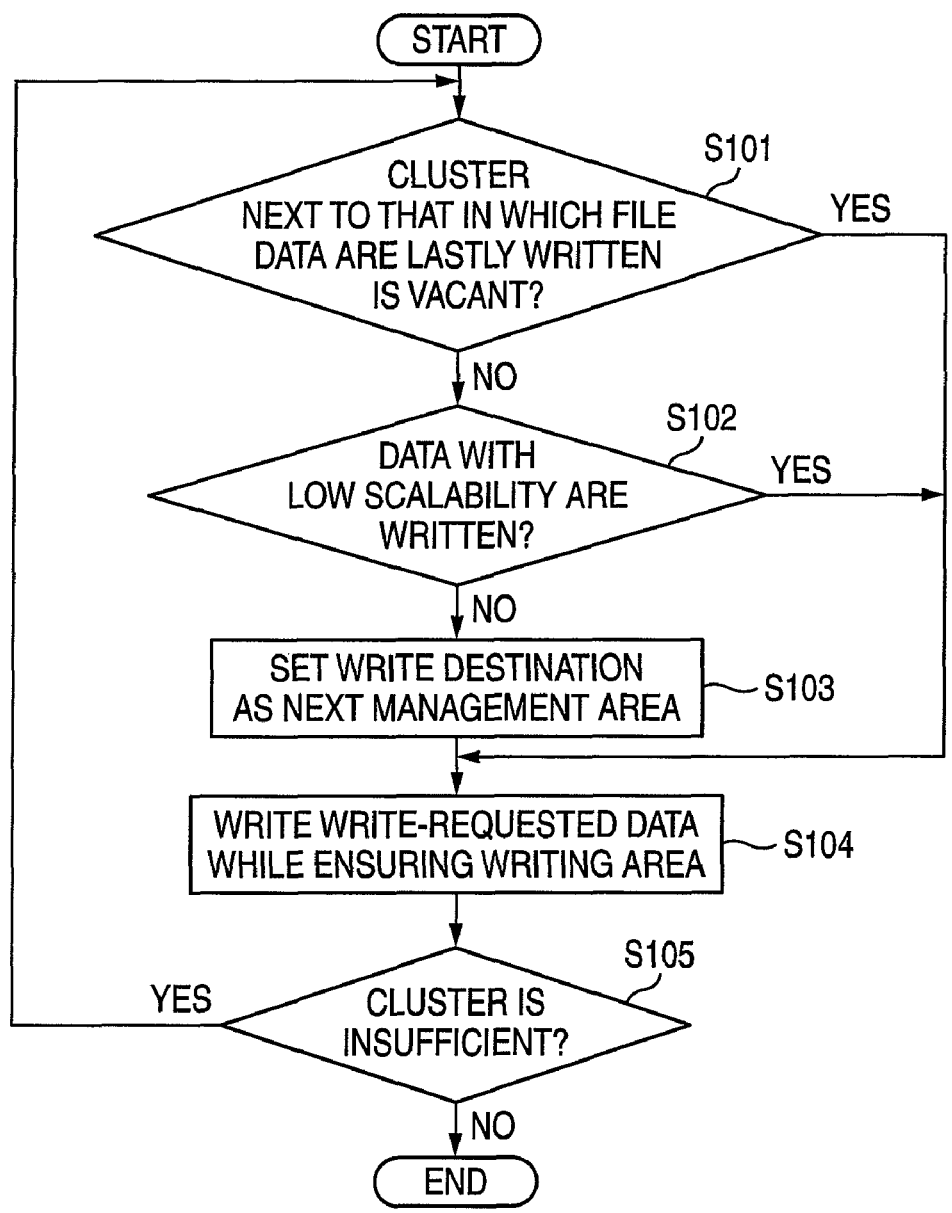
FIG. 10 is a flowchart illustrating another example of the recording area allocating process which is executed by the file system in the embodiment.

In advance of description of main process operations in the embodiment with reference to FIGS. 9 and 10, process operations performed by the file system 102 in the case where the main process operations are not performed will be briefly described.

Figure 8:
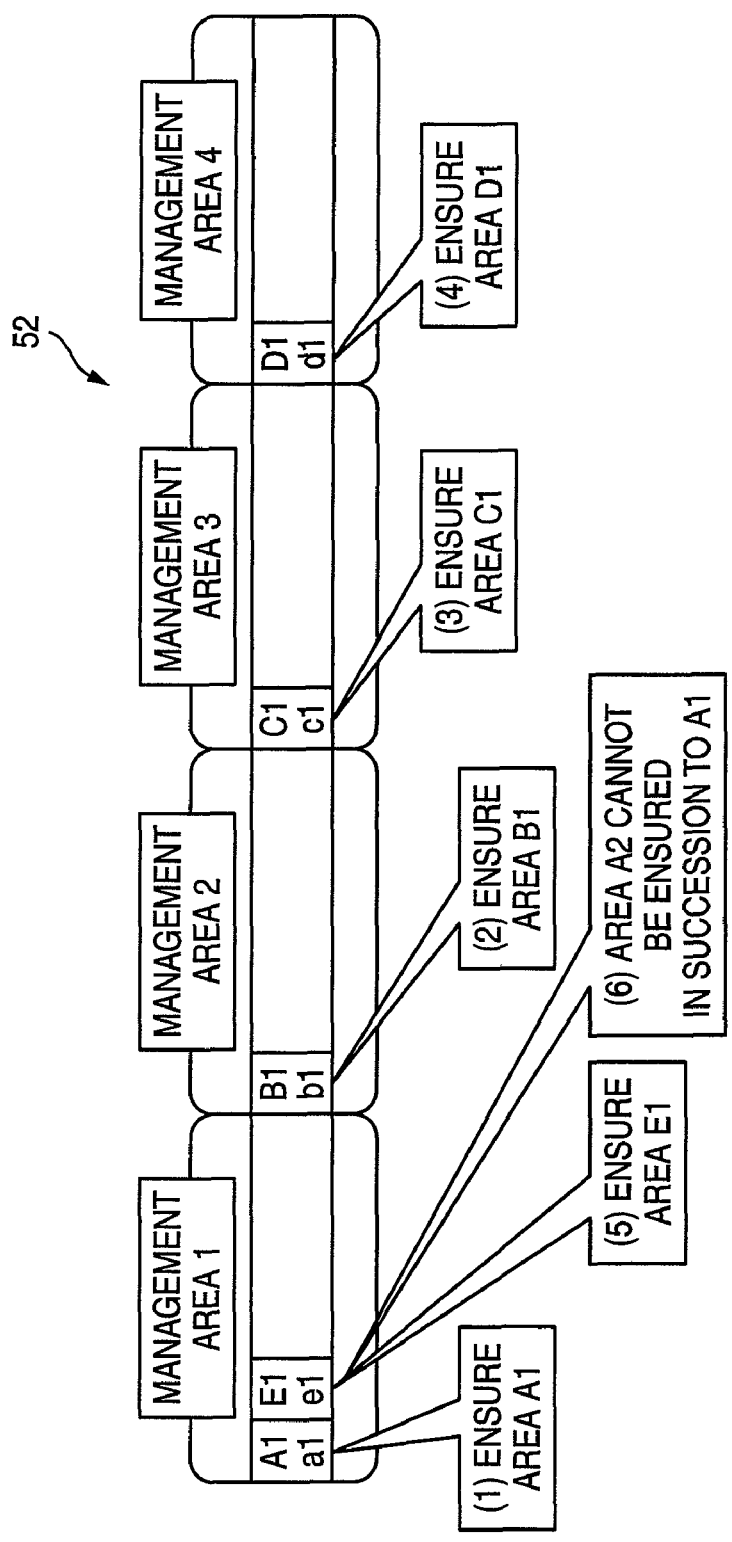
FIG. 8 is a diagram illustrating another example of the writing area allocating process which is performed on the plural divided management areas in the embodiment.

In the process operations performed by the file system 102, as shown in FIG. 8, the file data block 52 of the memory 202 is divided into four management areas 1 to 4. In the case where a request for writing file data a1 constituting file A is issued, first, area A1 configured by a cluster subsequent to the initial cluster in management area 1 is automatically ensured as an area in which file data a1 to which the writing request is issued are to be written [(1) in FIG. 8].

In the case where a request for writing file data b constituting other file B which is different from file A is issued, area B1 configured by a cluster subsequent to the initial cluster in next management area 2 is automatically ensured as an area in which file data b to which the writing request is issued are to be written [(2) in FIG. 8].

In the case where a request for writing file data c1 constituting other file C which is different from files A and B is issued, area C1 configured by a cluster subsequent to the initial cluster in next management area 3 is automatically ensured as an area in which file data c1 to which the writing request is issued are to be written [(3) in FIG. 8].

Similarly, in the case where a request for writing file data d1 constituting other file D which is different from files A to C is issued, area D1 configured by a cluster subsequent to the initial cluster in next management area 4 is automatically ensured as an area in which file data d1 to which the writing request is issued are to be written [(4) in FIG. 8].

In the above-described process operations by the file system 102, each time when a request for writing file data constituting a new file is issued, an area in which the file data are to be written is automatically ensured in the next management area.

In the case where a request for writing file data e1 constituting other file E which are different from the files A to D, i.e., fifth file E in which the file number exceeds the number of management areas 1 to 4 is issued, the management area is automatically returned to the initial management area 1, and area E1 in which file data e1 to which the writing request is issued are to be written is ensured in succession to area A1 in management area 1 [(5) in FIG. 8].

In the case where, after area E1 is ensured in management area 1, a request for writing file data a2 subsequent to file data a1 constituting file A is issued, therefore, area A2 in which file data a2 are to be written cannot be ensured in succession to area A1 in management area 1 [(6) in FIG. 8].

In the embodiment, therefore, the file system 102 divides the file data block 52 of the memory 202 into four management areas 1 to 4 as shown in FIG. 9. Then, in the case where a request for writing file data a1 constituting file A is issued, area A1 configured by a cluster subsequent to the initial cluster in management area 1 is automatically ensured as an area in which file data a1 to which the writing request is issued are to be written [(1) in FIG. 9].

In the case where a request for writing file data b constituting other file B which is different from file A is issued, it is determined whether the scalability of file data a1 written in area A1 in management area 1 exists or not, i.e., whether the possibility that file data subsequent to file data a1 exist is high or not. If it is determined that the scalability of file data a1 is high, area B1 configured by a cluster subsequent to the initial cluster in next management area 2 is ensured as an area in which file data b to which the writing request is issued are to be written [(2) in FIG. 9].

In the case where a request for writing file data c1 constituting other file C which is different from files A and B is issued, it is determined whether the scalability of file data b written in area B1 in management area 2 is high or not. If it is determined that file data b are data having a low scalability such as directory information, area C1 subsequent to area B1 in the same management area 2 is ensured as an area in which file data c1 to which the writing request is issued are to be written [(3) in FIG. 9].

In the case where a request for writing file data d1 constituting other file D which is different from files A to C is issued, it is determined whether the scalability of file data c1 written in area C1 in management area 2 is high or not. If it is determined that the scalability of the file data is high, area D1 configured by a cluster subsequent to the initial cluster in next management area 3 is ensured as an area in which file data d1 to which the writing request is issued are to be written [(4) in FIG. 9].

In the case where a request for writing file data e1 constituting other file E which are different from the files A to D is issued, it is determined whether the scalability of file data d1 written in area D1 in management area 3 is high or not. If it is determined that the scalability of the file data is high, area E1 configured by a cluster subsequent to the initial cluster in next management area 4 is ensured as an area in which file data e1 to which the writing request is issued are to be written [(5) in FIG. 9].

In the case where a request for writing file data a2 subsequent to file data a1 constituting the file A is issued, therefore, it is possible to ensure area A2 in which file data a2 are to be written in succession to area A1 in management area 1 [(6) in FIG. 9].

FIG. 10 is a flowchart collectively showing the process operations which have been described with reference to FIG. 9, and in which an area to be written is allocated in accordance with the scalability of written file data. The allocating process is executed by the file system 102, and, in the flowchart shown in FIG. 5, performed in the process of step S609.

The process operations are started when a request for writing file data is issued from the software (application) 101. In the case where a request for writing file data constituting file A is issued, for example, the file system 102 determines in step S101 whether, in management area 1 in which file data constituting file A are to be written, a cluster next to that in which file data are finally written is vacant or not.

If it is determined that the cluster is not vacant (NO), the file system 102 selects in step S102 a management area (in this case, management area 2) which is the next write destination, and determines whether the file data which are finally written in the management area are data having a low scalability such as directory information or not.

If it is determined that the file data are not data having a low scalability (NO), the file system 102 selects in step S103 a management area (in this case, management area 3) which is the next write destination, and, in step S104, ensures an area in which the file data to which the writing request is issued are to be written, in the management area, and executes a writing operation.

If it is determined in step S101 that the cluster is vacant (YES), or if it is determined in step S102 that the file data are data having a low scalability (YES), the file system 102 ensures in step S104 an area in which the file data to which the writing request is issued are to be written, in management area 1, and executes a writing operation.

Then, the file system 102 determines in step S105 whether the cluster in which the file data to which the writing request is issued are to be written is insufficient or not. If it is determined that the cluster is insufficient (YES), the control is returned to the process of step S101. If it is determined in step S105 that the cluster is not insufficient (NO), the process of the flowchart is ended, and the file system 102 is returned to the process of step S607 shown in FIG. 5.

According to the embodiment which has been described with reference to FIGS. 9 and 10, when one of the management areas is selected and file data are to be written, determination on the scalability of file data which are finally written in the selected management area is performed. If the scalability is high, the file data are written in the next management area, and, if the scalability is low, the file data to which the writing request is issued are written in succession to the file data. According to the configuration, when a plurality of files each configured by a plurality of file data are to be written onto an information recording medium (in this case, the memory 202), the possibility that the writing can be performed without impairing the continuity of file data of each file can be further improved.

In the embodiment described above, as data having a low scalability, directory information in a FAT file system is exemplarily used. The data are not restricted thereto. For example, also data having a property in which a trouble is not substantially caused by distributed recording are in the scope of data having a low scalability.

In the embodiment described above, as the timing when the determination whether the written data have a high scalability or not is performed, the timing when writing of the next data is requested is exemplarily used. The timing is not restricted thereto, and may be another timing. For example, when data are to be written, the level of scalability of the data is determined, the determination result is held, and, when next data are to be written, the held determination result is referred.

Figure 11:
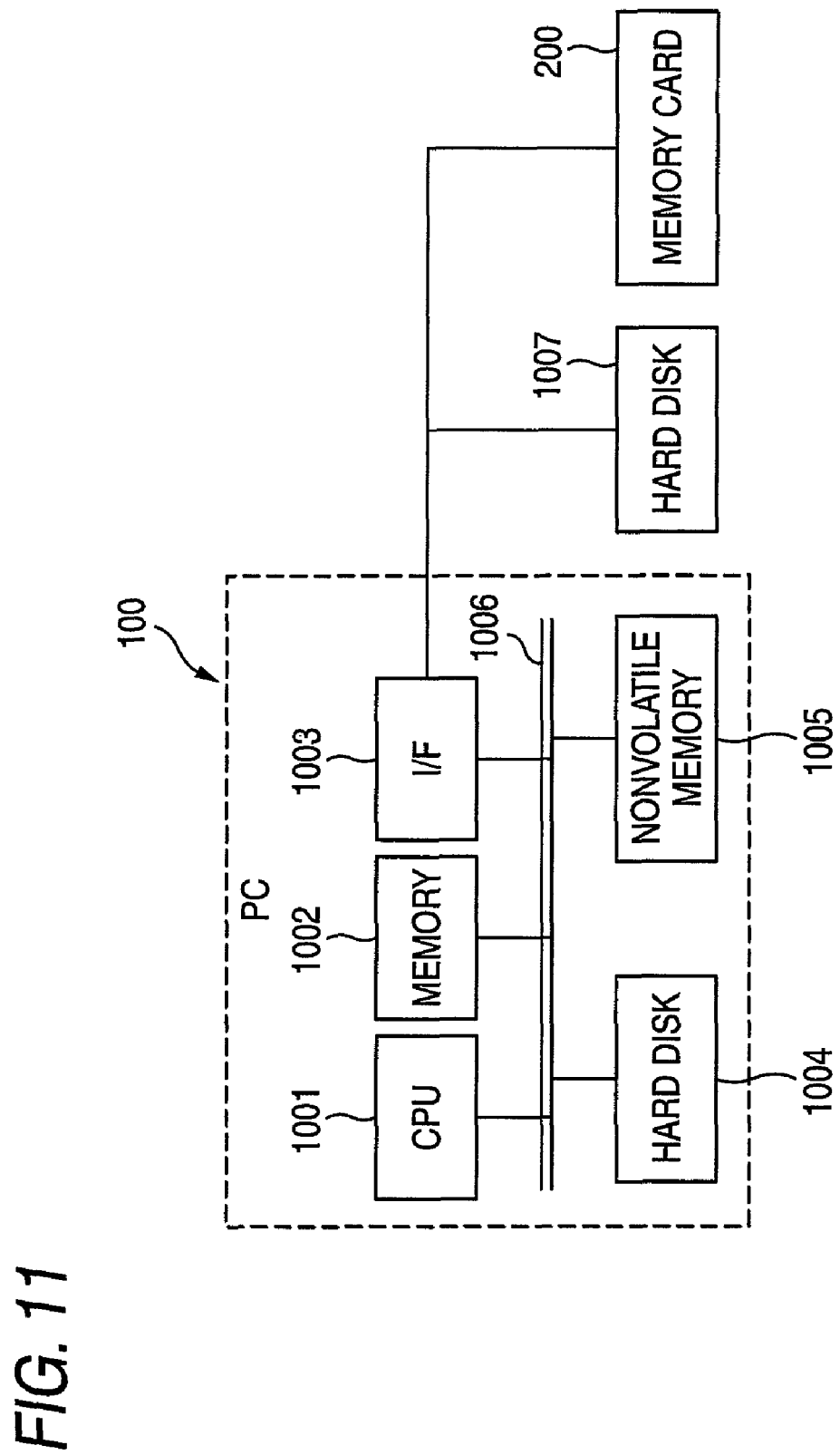
FIG. 11 is a block configuration diagram illustrating the basic configuration of the PC in the embodiment.
Figure 12:
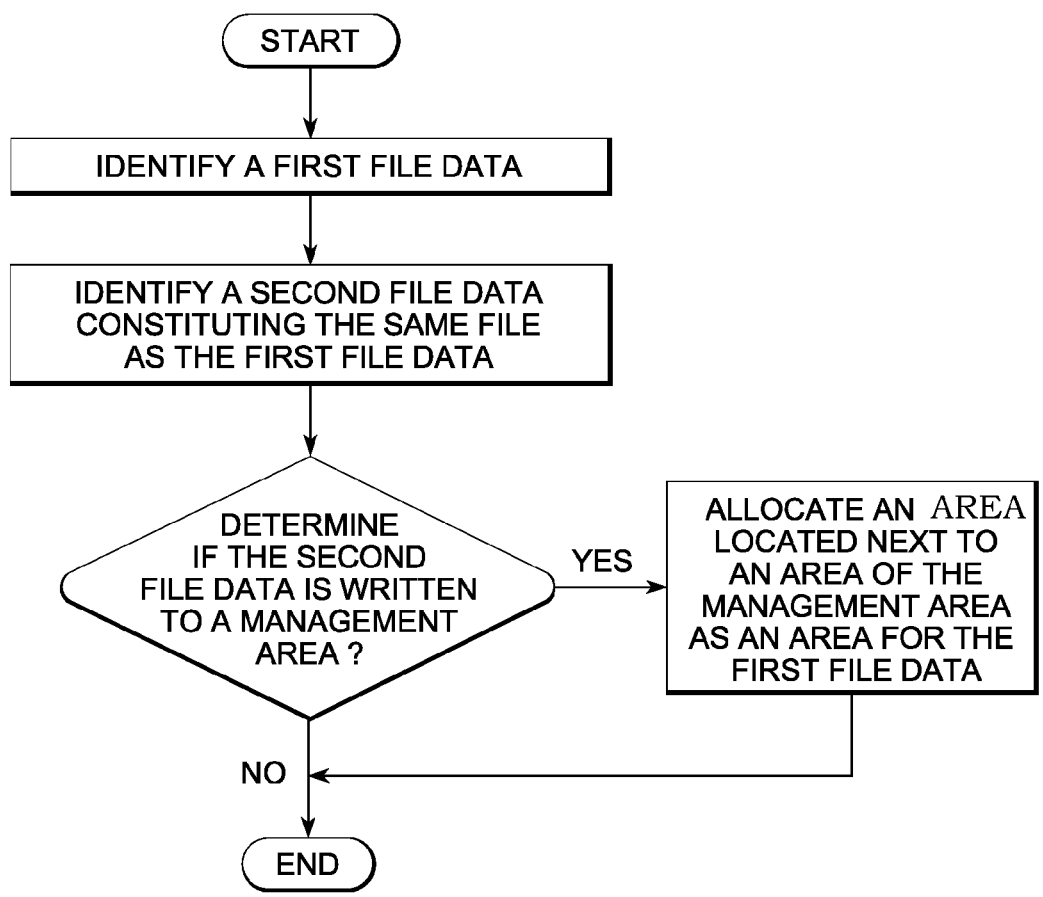
FIG. 12 is a flow ram depicting certain of the operations performed by a first controller in certain embodiments.
Figure 13:
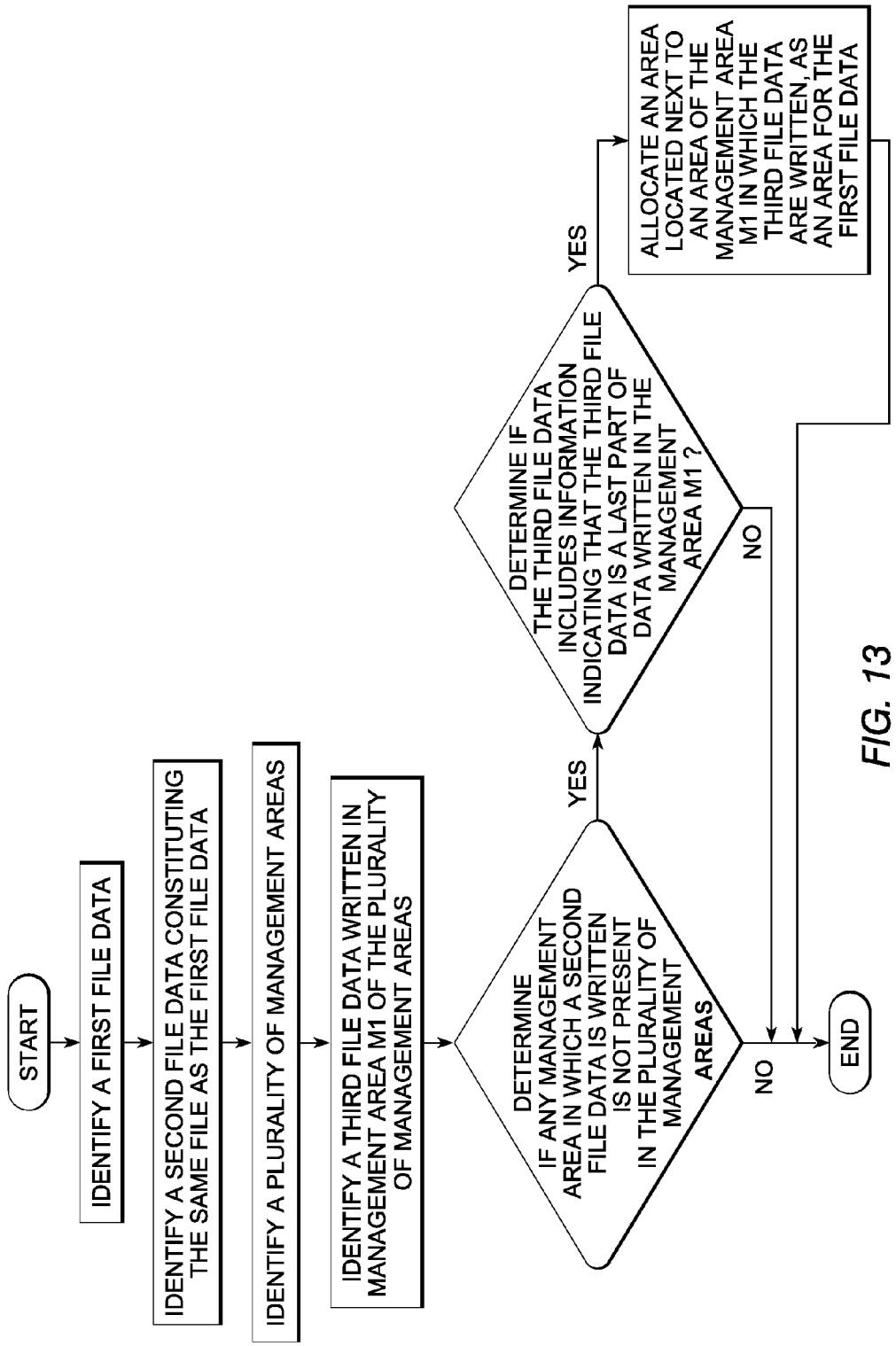
FIG. 13 is a flow ram depicting certain of the operations performed by a second controller in certain embodiments.

FIG. 11 shows the basic configuration of the PC 100. The PC 100 includes a CPU 1001 which is a main portion of the PC, and which concentrically controls various portions. A nonvolatile memory 1005 which is a read only memory storing the BIOS and the like, such as a ROM, and a memory 1002 which rewritably stores various data, such as a RAM are connected to the CPU 1001 through a bus 1006.

A hard disk 1004 which stores various programs such as a program for allocating management areas, and an I/F 1003 including a USB (Universal Serial Bus) connector for connecting an external hard disk 1007 to the PC 100, and a memory card interface 1003 into which the memory card 200 such as an SD card is to be inserted are connected to the bus 1006 through an I/O (not shown).

The memory 1002 has a property in which various data are rewritably stored, and hence functions as a work area for the CPU 1001; i.e., functions as a buffer.

The nonvolatile memory 1005 stores the OS (Operating System) and various programs. The CPU 1001 reads programs stored in the nonvolatile memory 1005, and installs them onto the hard disk 1004.

The information recording medium on which files are to be recorded is not restricted to the memory card 200. For example, various optical disks such as a DVD (Digital Versatile Disk), various magneto-optical disks, various magnetic disks such as a flexible disk, a semiconductor memory, and media of other types may be used.

Alternatively, programs may be downloaded from a network such as the Internet through a communication controlling apparatus (not shown), and then installed onto the hard disk 1004. In the alternative, the invention can be applied also to a recording apparatus which records programs in a transmission-side server.

The programs may operate on a predetermined OS. In this case, a part of various processes may be instead performed by the OS, or included as a part of a program file of a group constituting predetermined application software, the OS, and the like.

The CPU 1001 which controls the whole system executes various processes on the basis of programs loaded on the hard disk 1004 which is used as a main storage apparatus of the system.

The programs which are to be executed by the PC 100 are configured as a module including the above-described portions (the software 101, the file system 102, and the memory card interface 103). In the actual hardware configuration, the CPU 1001 (processor) reads a program from the above-described recording medium, and executes the program, whereby the above-described portions are loaded on the main storage apparatus, and the software 101, the file system 102, and the memory card interface 103 are produced on the main storage apparatus.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. An information recording apparatus comprising:
a dividing module configured to divide a recording area of an information recording medium into a plurality of management areas; and
an allocating module configured to allocate any one of the management areas as a writing area for first file data, when writing of the first file data is requested, the allocating module comprising:
a first controller, if second file data constituting a same file as the first file data are written in a first management area of the plurality of management areas, configured to allocate an area located next to an area of the first management area in which the second file data are written, as the writing area for the first file data;
a second controller, if any management area in which the second file data is written is not present in the plurality of the management areas, and third file data written in a second management area of the plurality of management areas include information indicating that the third file data is last part of data written in the second management area, configured to allocate an area located next to an area of the second management area in which the third file data are written, as the writing area for the first file data.

2. The information recording apparatus of claim 1, wherein if the file data are directory information in a file allocation table (FAT) file system, the second controller is configured to allocate an area located next to the area in which the third file data are written, as the writing area for the first file data.

3. The information recording apparatus of claim 2, wherein the allocating module further comprises:
a third controller, if the third file data do not include information indicating that the third file data is last part of data written in the second management area or if the third file data are not directly information in the FAT file system, configured to allocate a third management area different from the second management area as the writing area for the first file data.

4. The information recording apparatus of claim 3, wherein the allocating module further comprises:
a fourth controller, if no file date are written in the second management area, configured to allocate an area for writing file data writing of which is requested in the second management area.

5. An information recording method, the method comprising:
dividing a recording area of an information recording medium into a plurality of management areas;
if second file data constituting a same file as a first file data are written in a first management area of the plurality of management areas,
allocating an area located next to an area of the first management area in which the second file data are written, as an area for writing the first file data;
if any management area in which the second file data is written is not present in the plurality of the management areas, and third file data written in a second management area of the plurality of management areas include information indicating that the third file data is last part of data written in the second management area,
allocating an area located next to an area of the second management area in which the third file data are written, as the first management area for writing the first file data.

6. A non-transitory computer readable medium comprising an information recording program for causing a computer to execute operation comprising:
dividing a recording area of an information recording medium into a plurality of management areas;
if second file data constituting a same file as a first file data are written in a first management area of the plurality of management areas,
allocating an area located next to an area of the first management area in which the second file data are written, as an area for writing the first file data;
if any management area in which the second file data is written is not present in the plurality of the management areas, and third file data written in a second management area of the plurality of management areas include information indicating that the third file data is last part of data written in the second management area,
allocating an area located next to an area of the second management area in which the third file data are written, as the first management area for writing the first file data.

* * * * *